US010551250B2

(12) United States Patent
    Zhu et al.

(10) Patent No.: US 10,551,250 B2
(45) Date of Patent: Feb. 4, 2020

(54) DEVICE AND METHOD FOR TESTING DISPLAY PANEL

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Lixin Zhu, Beijing (CN); Ke Dai, Beijing (CN); Chunyang Nie, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/960,887

(22) Filed: Apr. 24, 2018

(65) Prior Publication Data

US 2019/0025126 A1    Jan. 24, 2019

(30) Foreign Application Priority Data

Jul. 19, 2017  (CN) .......................... 2017 1 0591713

(51) Int. Cl.
    *G01J 3/50*      (2006.01)
    *G01J 3/02*      (2006.01)
    (Continued)

(52) U.S. Cl.
    CPC .............. *G01J 3/506* (2013.01); *G01B 21/16* (2013.01); *G01B 21/20* (2013.01); *G01J 3/0202* (2013.01); *G06T 7/90* (2017.01)

(58) Field of Classification Search
    CPC ....................................................... G01J 3/506
    See application file for complete search history.

(56) References Cited

U.S. PATENT DOCUMENTS 6,320,652 B1 *  11/2001  Morimoto ................ G01J 3/02
                                                       356/124
6,330,026 B1 *  12/2001  Chan ........................ G01J 3/50
                                                       348/180

(Continued)

FOREIGN PATENT DOCUMENTS

CN          101118719 A      2/2008
CN          101324481 A     12/2008
                  (Continued)

OTHER PUBLICATIONS

Office Action dated Dec. 4, 2018 issued in corresponding Chinese Application No. 201710591713.3.

(Continued)

*Primary Examiner* — Shawn Decenzo
(74) *Attorney, Agent, or Firm* — Nath, Goldberg & Meyer; Joshua B. Goldberg; Daniel Bissing

(57) ABSTRACT

Disclosed are display panel test device and method. The device comprises: a color analyser including a host and a measuring probe, wherein the measuring probe can obtain optical information of a positional point of a light emitting surface of display panel, the positional point being a point to which the measuring probe is aligned on the light emitting surface, and the host can determine optical characteristics of the positional point according to the optical information; and a position determination component, configured to determine a positional identifier of the positional point on the light emitting surface, the positional identifier being capable of indicating a relative position of the positional point on the light emitting surface. Since the position determination component determines the position of the to-be-tested point, it is not necessary to visually place the measuring probe over the to-be-tested point, thereby improving the determination accuracy of the to-be-tested point.

19 Claims, 7 Drawing Sheets

(51) Int. Cl.
*G01B 21/20* (2006.01)
*G01B 21/16* (2006.01)
*G06T 7/90* (2017.01)

(56) References Cited

U.S. PATENT DOCUMENTS

| | | | |
|---|---|---|---|
| 8,238,640 B2 | 8/2012 | Sun et al. | |
| 9,223,441 B1 | 12/2015 | Bohn | |
| 9,964,403 B2* | 5/2018 | Xu | G01B 11/30 |
| 9,989,415 B1* | 6/2018 | Chan | G01J 1/30 |
| 2008/0143752 A1* | 6/2008 | Ou-Yang | G09G 3/20 |
| | | | 345/690 |
| 2011/0019191 A1* | 1/2011 | Hsu | G01J 3/02 |
| | | | 356/402 |
| 2011/0316813 A1* | 12/2011 | Gu | G06F 3/0416 |
| | | | 345/175 |
| 2012/0320221 A1* | 12/2012 | Park | G01J 3/506 |
| | | | 348/189 |
| 2014/0191118 A1* | 7/2014 | Dai | G02F 1/1309 |
| | | | 250/227.11 |
| 2014/0192351 A1* | 7/2014 | Lin | G01J 1/04 |
| | | | 356/218 |
| 2015/0042997 A1* | 2/2015 | Yang | G01N 21/59 |
| | | | 356/432 |
| 2017/0163979 A1* | 6/2017 | Fan | G01J 3/0264 |
| 2018/0295291 A1* | 10/2018 | Zhu | H04N 5/23296 |

FOREIGN PATENT DOCUMENTS

| | | |
|---|---|---|
| CN | 101398999 A | 4/2009 |
| CN | 101710486 | 5/2010 |
| CN | 101806963 A | 8/2010 |
| CN | 104508425 A | 4/2015 |
| CN | 104665836 A | 6/2015 |
| CN | 104677314 A | 6/2015 |
| TW | 201201079 A1 | 1/2012 |

OTHER PUBLICATIONS

The Second Office Action dated Jul. 25, 2019 corresponding to Chinese application No. 201710591713.3.

* cited by examiner

US 10,551,250 B2

DEVICE AND METHOD FOR TESTING DISPLAY PANEL

CROSS-REFERENCE TO RELATED APPLICATION

This application claims the benefit of China Patent Application No. 201710591713.3, filed on Jul. 19, 2017, titled "DEVICE AND METHOD FOR TESTING DISPLAY PANEL"; which is hereby incorporated by reference herein in its entirety.

FIELD

The disclosure relates to the field of manufacturing display panels, and in particular to a display panel test device and a display panel test method.

BACKGROUND

At present, in order to detect the display effect of display panels, optical characteristics of a to-be-tested point at the same position on each of the display panels having the same model are usually tested. For example, when the to-be-tested point is a central point, the optical characteristics of the central point of each of the display panels having the same model can be tested to detect the display effect of the respective display panel.

SUMMARY

In the first aspect, according to an embodiment of the disclosure, the display panel test device comprises:

a color analyser, including a host and a measuring probe, wherein the measuring probe is configured to obtain optical information of a positional point on a light emitting surface of a display panel, the positional point being a point to which the measuring probe is aligned on the light emitting surface of the display panel, and the host is configured to determine optical characteristics of the positional point according to the optical information; and a position determination component, configured to determine a positional identifier of the positional point on the light emitting surface of the display panel, the positional identifier being capable of indicating a relative position of the positional point on the light emitting surface of the display panel.

Optionally, the measuring probe comprises a measuring rod and a probe body disposed at one end of the measuring rod, the position determination component further comprises a processing unit and an angle measurer, and the light emitting surface of the display panel is formed into a shape having at least three vertices;

the angle measurer is disposed at a calibration point of the measuring rod, and a straight line defined by the calibration point and the positional point is perpendicular to the light emitting surface of the display panel;

the angle measurer is configured to measure a first included angle formed between a first line segment and a second line segment, wherein the first line segment is defined as a line segment where the calibration point and a first vertex of the light emitting surface of the display panel are connected, and the second line segment is defined as a line segment where the calibration point and the positional point are connected;

the angle measurer is further configured to measure a second included angle formed between a third line segment and the second line segment, wherein the third line segment is defined as a line segment where the calibration point and a second vertex of the light emitting surface of the display panel are connected, and the first vertex and the second vertex are any two adjacent vertices of the light emitting surface of the display panel; and the processing unit is configured to determine a first distance between the positional point and the first vertex according to the first included angle and a length of the second line segment and determine a second distance between the positional point and the second vertex according to the second included angle and the length of the second line segment, wherein the first distance and the second distance form the positional identifiers.

Optionally, the measuring probe comprises a measuring rod and a probe body disposed at one end of the measuring rod, the position determination component further comprises a processing unit and a distance measurer, and the light emitting surface of the display panel is formed into a shape having at least three vertices;

the distance measurer is disposed at a calibration point of the measuring rod, and a straight line defined by calibration point and the positional point is perpendicular to the light emitting surface of the display panel;

the distance measurer is configured to measure a first to-be-measured distance between the calibration point and a first vertex on the light emitting surface of the display panel, and to measure a second to-be-measured distance between the calibration point and a second vertex on the light emitting surface of the display panel, wherein the first vertex and the second vertex are any two adjacent vertices of the light emitting surface of the display panel; and the processing unit is configured to determine a first distance between the positional point and the first vertex according to a distance between the calibration point and the positional point and the first to-be-measured distance, and determine a second distance between the positional point and the second vertex according to a distance between the calibration point and the positional point and the second to-be-measured distance, wherein the first distance and the second distance form the positional identifiers.

Optionally, the measuring probe comprises a measuring rod and a probe body disposed at one end of the measuring rod, the position determination component further comprises a processing unit, a distance measurer, and an angle measurer, the distance measurer and the angle measurer are disposed at a calibration point of the measuring rod, and the light emitting surface of the display panel is formed into a shape having at least three vertices;

the distance measurer is configured to measure a first to-be-measured distance between the calibration point and a first vertex, and to measure a second to-be-measured distance between the calibration point and a second vertex, wherein the first vertex and the second vertex are any two adjacent vertices of the light emitting surface of the display panel;

the angle measurer is configured to measure a first included angle formed between a first line segment and a second line segment, and the angle measurer is further configured to measure a second included angle formed between a third line segment and the second line segment, wherein the first line segment is defined as a line segment where the calibration point and the first vertex are connected, the second line segment is defined as a line segment where the calibration point and the positional point are connected, and the third line segment is defined as a line segment where the calibration point and the second vertex are connected; and the processing unit is configured to determine a first distance between the calibration point and the first vertex according to a length of the second line segment, the first to-be-measured distance and the first included angle, and determine a second distance between the calibration point and the second vertex according to the length of the second line segment, the second to-be-measured distance and the second included angle, wherein the first distance and the second distance form the positional identifiers.

Optionally, the probe body has a test surface capable of being attached to the positional point to obtain optical information of the positional point, and a straight line defined by the calibration point and the positional point is perpendicular to the test surface;

the processing unit is further configured to determine a flatness of the light emitting surface of the display panel according to the first included angle, the first to-be-measured distance and the length of the second line segment, wherein the first to-be-measured distance is defined as a distance between the calibration point and the first vertex;

and/or the processing unit is configured to determine a flatness of the light emitting surface of the display panel according to the second included angle, the second to-be-measured distance and the length of the second line segment, wherein the second to-be-measured distance is defined as a distance between the calibration point and the second vertex.

Optionally, the distance measurer is at least one of an infrared distance sensor, a laser distance sensor, an ultrasonic distance sensor, and a radar distance sensor.

Optionally, the measuring rod and the position determination component are rotatably connected such that the position determination component is able to rotate about an axis of the measuring rod.

In the second aspect, according to an embodiment of the disclosure, the display panel test method is applicable to the display panel test device including the position determination component and the color analyser as described above, the color analyser including the host and the measuring probe, and the method comprises steps of:

determining, by the position determination component, a positional identifier of an initial positional point of the measuring probe on a light emitting surface of a display panel;

moving the measuring probe to a to-be-tested point according to the positional identifier of the initial positional point and a predefined positional identifier of the to-be-tested point; and testing at the to-be-tested point.

Optionally, the measuring probe comprises a measuring rod and a probe body disposed at one end of the measuring rod, the position determination component further comprises a processing unit and an angle measurer, the angle measurer is disposed at a calibration point of the measuring rod, a straight line defined by the calibration point and the positional point is perpendicular to the light emitting surface of the display panel, and the light emitting surface of the display panel is formed into a shape having at least three vertices, and the step of determining, by the position determination component, a positional identifier of an initial positional point of the measuring probe on a light emitting surface of a display panel comprises:

measuring a first included angle formed between a first line segment and a second line segment by an angle measurer, wherein the first line segment is defined as a line segment where the calibration point and a first vertex of the light-emitting surface of the display panel are connected, and the second line segment is defined as a line segment where the calibration point and the positional point are connected;

measuring a second included angle formed between a third line segment and the second line segment by the angle measurer, wherein the third line segment is defined as a line segment where the calibration point and a second vertex of the light emitting surface of the display panel are connected, and the first vertex and the second vertex are any two adjacent vertices on the light emitting surface of the display panel; and determining, by the processing unit, a first distance between the positional point and the first vertex according to the first included angle and a length of the second line segment and determining a second distance between the positional point and the second vertex according to the second included angle and the length of the second line segment, wherein first distance and the second distance form the positional identifiers.

Optionally, the measuring probe comprises a measuring rod and a probe body disposed at one end of the measuring rod, the position determination component further comprises a processing unit and a distance measurer, the distance measurer is disposed at a calibration point of the measuring rod, a straight line defined by the calibration point and the positional point is perpendicular to the light emitting surface of the display panel, the light emitting surface of the display panel is formed into a shape having at least three vertices, and the step of determining, by the position determination component, a positional identifier of an initial positional point of the measuring probe on a light emitting surface of a display panel comprises:

measuring a first to-be-measured distance between the calibration point and a first vertex of the light emitting surface of the display panel by the distance measurer;

measuring a second to-be-measured distance between the calibration point and a second vertex of the light emitting surface of the display panel by the distance measurer, wherein the first vertex and the second vertex are any two adjacent vertices on the light emitting surface of the display panel;

determining, by the processing unit, a first distance between the positional point and the first vertex according to a distance between the calibration point and the positional point and the first to-be-measured distance and determining a second distance between the positional point and the second vertex according to the distance between the calibration point and the positional point and the second to-be-measured distance, wherein the first distance and the second distance form the positional identifiers.

Optionally, the measuring probe comprises a measuring rod and a probe body disposed at one end of the measuring rod, the position determination component further comprises a processing unit, a distance measurer, and an angle measurer, the distance measurer and the angle measurer are disposed at a calibration point of the measuring rod, and the light emitting surface of the display panel is formed into a shape having at least three vertices, the step of determining, by the position determination component, a positional identifier of an initial positional point of the measuring probe on a light emitting surface of a display panel comprises:

measuring, by the distance measurer, a first to-be-measured distance between the calibration point and a first vertex, and a second to-be-measured distance between the calibration point and a second vertex, wherein the first vertex and the second vertex are any two adjacent vertices on the light emitting surface of the display panel;

measuring, by the angle measurer, a first included angle formed between a first line segment and a second line segment, and a second included angle formed between a third line segment and the second line segment, wherein the first line segment is defined as a line segment where the calibration point and the first vertex are connected, the second line segment is defined as a line segment where the calibration point and the positional point are connected and the third line segment is defined as a line segment where the calibration point and the second vertex are connected; and determining, by the processing unit, a first distance between the calibration point and the first vertex according to a length of the second line segment, the first to-be-measured distance and the first included angle, and determining a second distance between the calibration point and the second vertex according to the length of the second line segment, the second to-be-measured distance and the second included angle, wherein the first distance and the second distance form the positional identifiers.

Optionally, the step of determining, by the processing unit, a first distance between the calibration point and the first vertex according to a length of the second line segment, the first to-be-measured distance and the first included angle, and determining a second distance between the calibration point and the second vertex according to the length of the second line segment, the second to-be-measured distance and the second included angle, comprises:

determining, by the processing unit, the first distance between the calibration point and the first vertex according to a first predefined formula, which is $\rho_1 = \sqrt{m_1^2 + h_1^2 - 2m_1 h_1 \cos a}$, wherein $\rho_1$ is the first distance, $m_1$ is the first to-be-measured distance, $h_1$ is the length of the second line segment, and a is the first included angle; and determining, by the processing unit, the second distance between the calibration point and the second vertex according to a second predefined formula, which is $\rho_2 = \sqrt{n_1^2 + h_1^2 - 2n_1 h_1 \cos b}$, wherein $\rho_2$ is the second distance, $n_1$ is the second to-be-measured distance, and b is the second included angle.

Optionally, the probe body has a test surface capable of being attached to the positional point to obtain optical information of the positional point, and a straight line defined by the calibration point and the positional point is perpendicular to the test surface, prior to the step of determining, by the processing unit, a first distance between the calibration point and the first vertex according to a length of the second line segment, the first to-be-measured distance and the first included angle, and determining a second distance between the calibration point and the second vertex according to the length of the second line segment, the second to-be-measured distance and the second included angle, the method further comprises;

determining, by the processing unit, a flatness of the light emitting surface of the display panel according to the first included angle, the first to-be-measured distance and the length of the second line segment, wherein the first to-be-measured distance is defined as a distance between the calibration point and the first vertex; and/or determining, by the processing unit, a flatness of the light emitting surface of the display panel according to the second included angle, the second to-be-measured distance and the length of the second line segment, wherein the second to-be-measured distance is defined as a distance between the calibration point and the second vertex; and performing the step of determining, by the processing unit, a first distance between the calibration point and the first vertex according to a length of the second line segment, the first to-be-measured distance and the first included angle, and determining a second distance between the calibration point and the second vertex according to the length of the second line segment, the second to-be-measured distance and the second included angle, in a condition that the light emitting surface of the display panel is not flat.

BRIEF DESCRIPTION OF THE DRAWINGS

In order to more definitely explain the technical solutions of the embodiments of the present disclosure, accompanying drawings used in the description of the embodiments will be briefly described below. Obviously, the accompanying drawings in the description are merely some of the embodiments of the present disclosure. For those of ordinary skill in the art, further drawings may also be obtained based on these drawings without any creative work.

DETAILED DESCRIPTION OF THE EMBODIMENTS

In order that the objectives, technical solutions, and advantages of the present disclosure become more apparent, the embodiments of the present disclosure will be described in detail hereinafter with reference to the accompanying drawings.

In the related art, the display panel is first configured to display a pre-set checkerboard, and then a tester determines the position of the to-be-tested point with the assistance of the checkerboard. Next, the tester visually places a measuring probe of a Color Analyser (CA) at the to-be-tested point on a light emitting surface of the display panel to test the optical characteristics of the to-be-tested point.

However, the tester visually places the measuring probe of the CA at the to-be-tested point with a large error. It is difficult to accurately determine the to-be-tested point on the display panel by the above method.

In order to detect the display effect of the display panel, the tester usually needs to perform an optical characteristic test at the same position of a to-be-tested point on each of display panels having the same model. When the to-be-tested point is being detected, a measuring probe can acquire optical information of a plurality of pixels in a small area (where the to-be-tested point is located). In the traditional technologies, the tester visually places a measuring probe of a Color Analyser on a to-be-tested point on a light emitting surface of a display panel (the light emitting surface of the display panel is usually in a regular shape) and tests the optical characteristics of the to-be-tested point.

Figure 1:
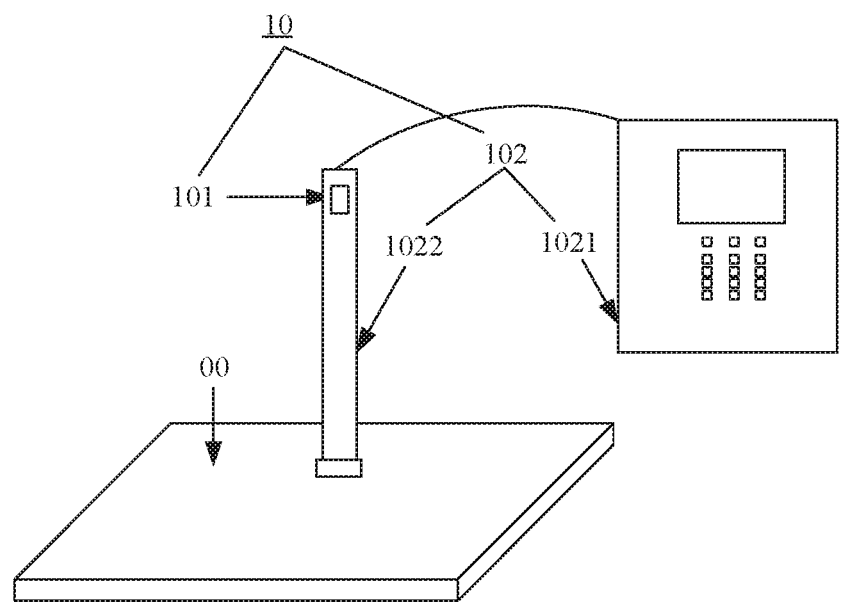
FIG. 1 is a schematic structural diagram of a display panel test device according to an embodiment of the present disclosure.

There is a relatively large error by visually placing the measuring probe of the Color Analyser over the to-be-tested point. In order to address this problem, as shown in FIG. 1, an embodiment of the present disclosure provides a display panel test device 10. The display panel test device 10 includes a position determination component 101 and a color analyser 102.

The color analyser 102 includes a host 1021 and a measuring probe 1022. The measuring probe 1022 is configured to obtain optical information of a positional point of a light emitting surface 00 of a display panel. The positional point is a point to which the measuring probe 1022 is aligned on the light emitting surface 00 of the display panel. The host 1021 is configured to determine optical characteristics of the positional point according to the optical information.

The position determination component 101 is configured to determine a positional identifier of the positional point on the light emitting surface 00 of the display panel. The positional identifier is used to indicate a relative position of the positional point on the light emitting surface 00 of the display panel.

When the display panel test device 10 according to the embodiment of the present disclosure is being used, the measuring probe 1022 can be moved in accordance with a positional identifier of the measuring probe 1022 at an initial positional point determined by the position determination component 101 and a predefined positional identifier of the to-be-tested point. The measuring probe 1022 can be aligned to the to-be-tested point to acquire the optical information of the to-be-tested point. The host 1021 can obtain the optical characteristics of the to-be-tested point based on the optical information.

In summary, the display panel test device according to the embodiment of the present disclosure can determine the positional identifier of the positional point to which the measuring probe is aligned on the light emitting surface of the display panel through the position determination component, align the measuring probe to the to-be-tested point according to the positional identifier of the positional point and the positional identifier of the predefined to-be-tested point, and then acquire the optical characteristics of the to-be-tested point through the color analyser. In this way, it is not necessary to visually place the measuring probe over the to-be-tested point, thereby improving the determination accuracy of the to-be-tested point. Therefore, the problem that there is a relatively large error by visually placing the measuring probe of the Color Analyser over the to-be-tested point in the related art can be resolved. In addition, an effect of accurately determining the position of the to-be-tested point on the display panel to analyse the optical characteristics thereof can be achieved.

Figure 2A:
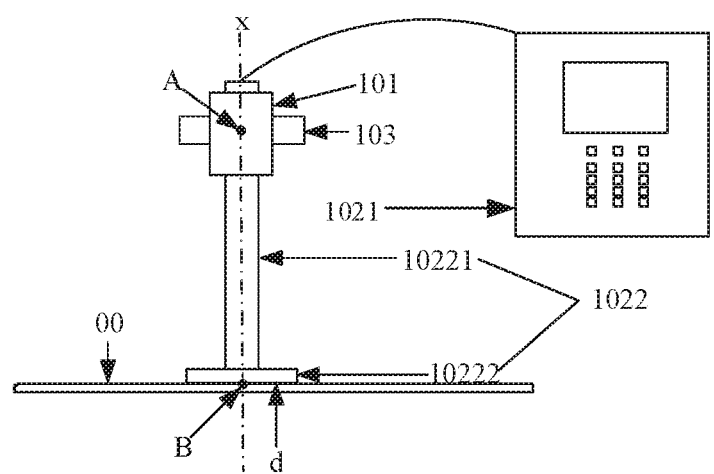
FIG. 2a is a schematic structural diagram of a display panel test device according to another embodiment of the present disclosure.

FIG. 2a is a schematic structural diagram of a display panel test device according to another embodiment of the present disclosure. As shown in FIG. 2a, optionally, the measuring probe 1022 includes a measuring rod 10221 and a probe body 10222. The probe body 10222 is disposed at one end of the measuring rod 10221 and has a test surface d. A point to which the probe body 10222 is aligned is the positional point B. For example, the positional point B can be a point to which a centre of the test surface d is aligned. The test surface d can be attached to the positional point B of the light emitting surface 00 of the display panel to obtain the optical information of the positional point B.

The position determination component 101 is disposed at a calibration point A of the measuring rod 10221. Optionally, a straight line defined by the calibration point A and the positional point B is perpendicular to the test surface d. Therefore, when the test surface d is attached to the light emitting surface 00 of the display panel, the straight line defined by the calibration point A and the position B is also perpendicular to the light emitting surface 00 of the display panel.

Optionally, the host 1021 and the measuring probe 1022 may be connected in a wired or wireless manner.

As shown in FIG. 2a, the position determination component 101 can be rotatably connected to the measuring rod 10221 via a rotatable ring 103, The rotatable ring 103 is connected to the measuring rod 10221 and can rotate about an axis x of the measuring rod 10221, it can be understood that the position determination component 101 can also be rotatably connected to the measuring rod 10221 by other means. For example, a pivot may be disposed at one end of the measuring rod 10221 on which the probe body 10222 is not provided, and the position determination member 101 may be coupled to the pivot. The embodiments of the present disclosure are not limited thereto.

According to the difference of the position determination components, the display panel test device provided in the embodiment of the present disclosure may be embodied in various forms. Description will be provided in conjunction with the following examples herein.

Figure 2B:
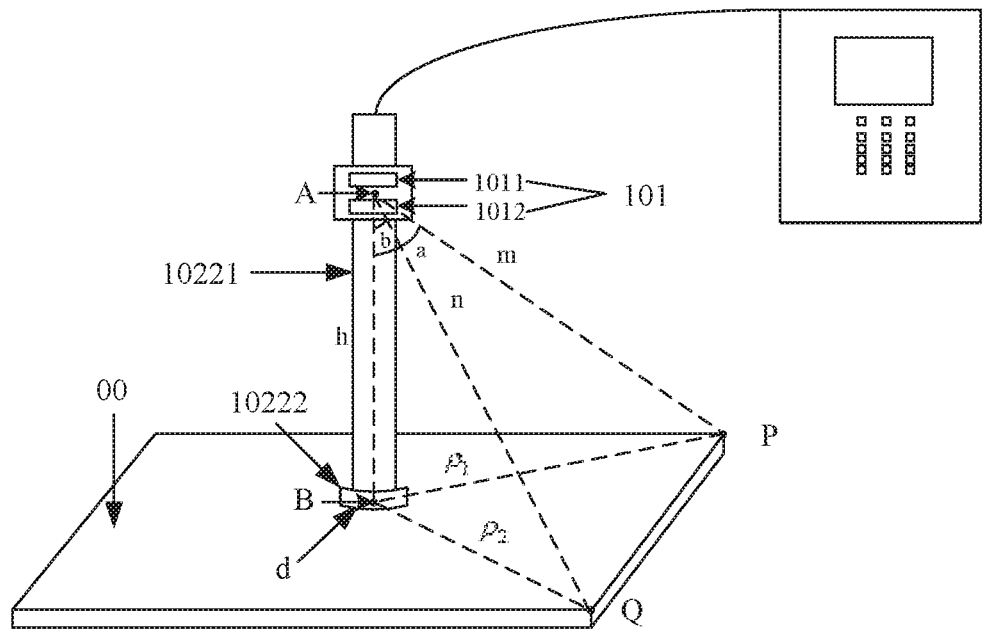
FIG. 2b is a schematic structural diagram of a display panel test device according to another embodiment of the present disclosure.

As shown in FIG. 2b, for example, the position determination component 101 in the display panel test device includes a processing unit 1011 and an angle measurer 1012.

The angle measurer 1012 is disposed at a calibration point A of the measuring rod 10221, and a straight line defined by the calibration point A and the positional point B is perpendicular to the light emitting surface 00 of the display panel. The light emitting surface 00 of the display panel is formed into a shape having at least three vertices. For example, as shown in FIG. 2b, the light emitting surface 00 of the display panel is in a rectangular shape with four vertices. The angle measurer 1012 is configured to measure a first included angle a formed between a first line segment m and a second line segment h. The first line segment in is defined as a line segment where the calibration point A and a first vertex P of the light emitting surface 00 of the display panel are connected. The second line segment h is defined as a line segment where the calibration point A and the positional point B are connected. The angle measurer 1012 is further configured to measure a second included angle b formed between a third line segment n and the second line segment h. The third line segment n is defined as a line segment where the calibration point A and a second vertex Q of the light emitting surface 00 of the display panel are connected. The first vertex P and the second vertex Q are any two adjacent vertices of the light emitting surface 00 of the display panel. Here, a length of the second line segment h has a known value and can be set by the tester.

The processing unit 1011 is configured to determine a first distance between the positional point B and the first vertex P according to the first included angle a and a length of the second line segment h, and determine a second distance $\rho_2$ between the positional point B and the second vertex Q according to the second included angle b and the length of the second line segment h, wherein the first distance $\rho_1$ and the second distance $\rho_2$ can form the positional identifiers. The first distance $\rho_1$ and the second distance $\rho_2$ may be determined according to a method of an embodiment of the present disclosure.

Figure 2C:
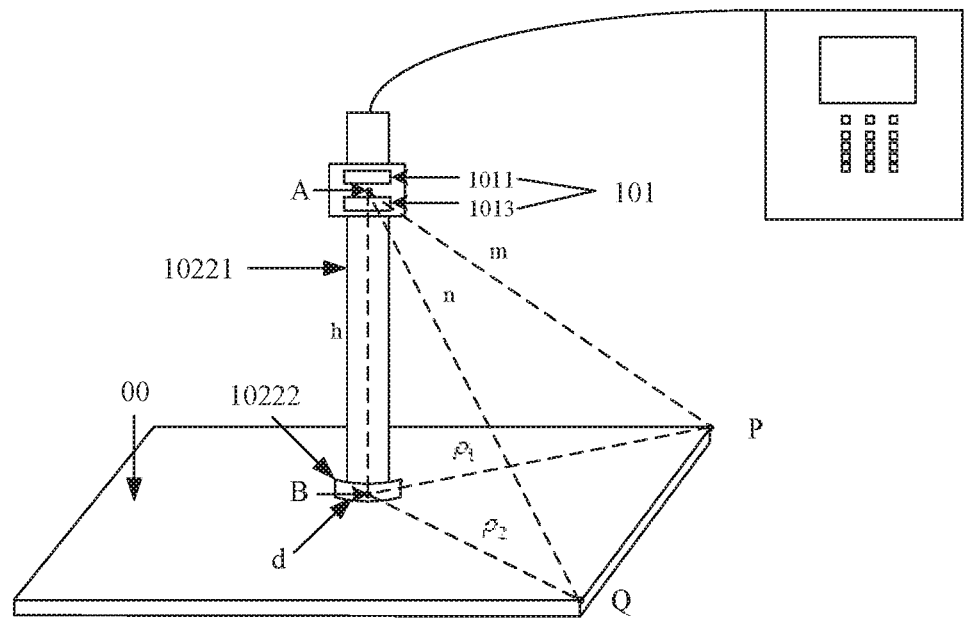
FIG. 2c is a schematic structural diagram of a display panel test device according to another embodiment of the present disclosure.

As shown in FIG. 2c, the position determination component 101 of the display panel test device includes a processing unit 1011 and a distance measurer 1013. The distance measurer 1013 is disposed at a calibration point A of the measuring rod 10221, and a straight line defined by the calibration point A and the positional point B is perpendicular to the light emitting surface 00 of the display panel. The light emitting surface 00 of the display panel is formed into a shape having at least three vertices. For example, as shown in FIG. 2c, the light emitting surface 00 of the display panel is in a rectangular shape with four vertices.

The distance measurer 1013 is configured to measure a first to-be-measured distance (i.e., a length of the first line segment m) between the calibration point A and the first vertex P on the light emitting surface 00 of the display panel, and to measure a second to-be-measured distance (i.e., a length of the first line segment h) between the calibration point A and the second vertex Q on the light emitting surface 00 of the display panel.

The processing unit 1011 is configured to determine a first distance $\rho_1$ between the positional point B and the first vertex P according to the length of the second line segment h between the calibration point A and the positional point B and the first to-be-measured distance, and determine a second distance $\rho_2$ between the positional point B and the second vertex Q according to the length of the second line segment h between the calibration point A and the positional point B and the second to-be-measured distance, wherein the first distance $\rho_1$ and the second distance $\rho_2$ can form positional identifiers. The first distance $\rho_1$ and the second distance $\rho_2$ may be determined according to a method of an embodiment of the present disclosure.

Figure 2D:
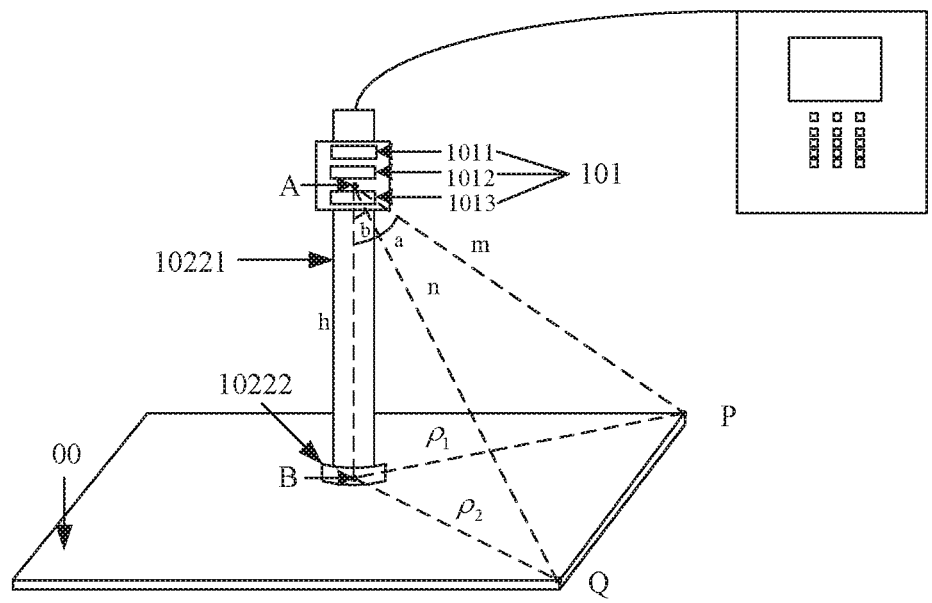
FIG. 2d is a schematic structural diagram of a display panel test device according to another embodiment of the present disclosure.

As shown in FIG. 2d, the position determination component 101 of the display panel test device includes a processing unit 1011, a distance measurer 1013, and an angle measurer 1012. The distance measurer 1013 and the angle measurer 1012 are disposed at a calibration point A of the measuring rod 10221. A straight line defined by the calibration point A and the positional point B is perpendicular to the light emitting surface 00 of the display panel. The light emitting surface 00 of the display panel is formed into a shape having at least three vertices. For example, as shown in FIG. 2d, the light emitting surface 00 of the display panel is in a rectangular shape with four vertices.

The distance measurer 1013 is configured to measure the first to-be-measured distance between the calibration point A and the first vertex P of the light emitting surface 00 of the display panel and measure the second to-be-measured distance between the calibration point A and the second vertex Q of the light emitting surface 00 of the display panel.

The angle measurer 1012 is configured to measure a first included angle a formed between a first line segment m and a second line segment h. The first line segment m is defined as a line segment where the calibration point A and the first vertex P of the light emitting surface of the display panel are connected. The second line segment h is defined as a line segment where the calibration point A and the positional point B are connected. The angle measurer 1012 is further configured to measure a second included angle b formed between a third line segment n and the second line segment h. The third line segment n is defined as a line segment where the calibration point A and the second vertex Q of the light emitting surface of the display panel are connected. The first vertex P and the second vertex Q are any two adjacent vertices on the light emitting surface 00 of the display panel.

The processing unit 1011 is configured to determine a first distance $\rho_1$ between the calibration point A and the first vertex P according to a length of the second line segment h, the first to-be-measured distance and the first included angle a, and determine a second distance $\rho$1 between the calibration point B and the second vertex Q according to a length of the second line segment h, the second to-be-measured distance and the second included angle b, wherein the first distance $\rho_1$ and the second distance $\rho_2$ can form positional identifiers. Herein, the length of the second line segment h is a known value and can be set by a tester. The first distance $\rho_1$ and the second distance $\rho_2$ may be determined according to a method of an embodiment of the present disclosure.

Optionally, the processing unit 1011 is further configured to determine a flatness of the light emitting surface 00 of the display panel according to the first included angle a, the first to-be-measured distance and the length of the second line segment h, wherein the first to-be-measured distance is defined as a distance between the calibration point A and the first vertex P; and/or the processing unit 1011 is configured to determine a flatness of the light emitting surface 00 of the display panel according to the second included angle b, the second to-be-measured distance and the length of the second line segment h, wherein the second to-be-measured distance is defined as a distance between the calibration point A and the second vertex Q.

Figure 2E:
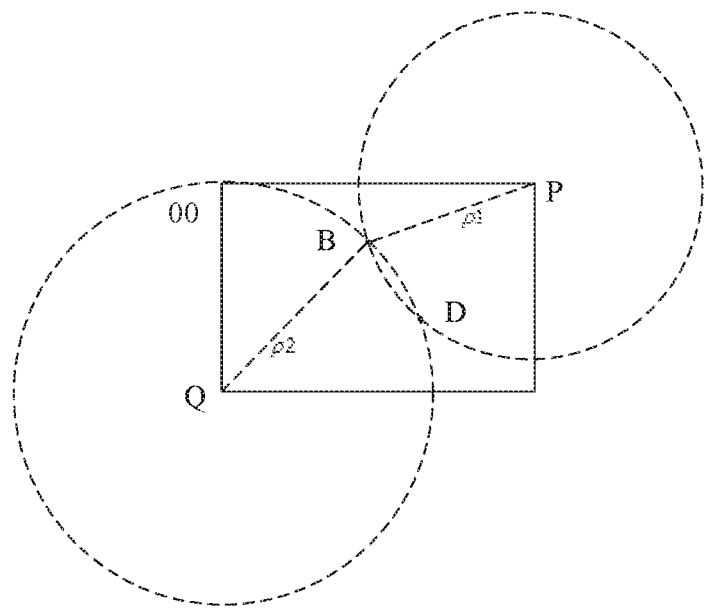
FIG. 2e is a schematic diagram showing the determination of a point of a light emitting surface of a display panel based on a positional identifier according to an embodiment of the present disclosure.
Figure 2F:
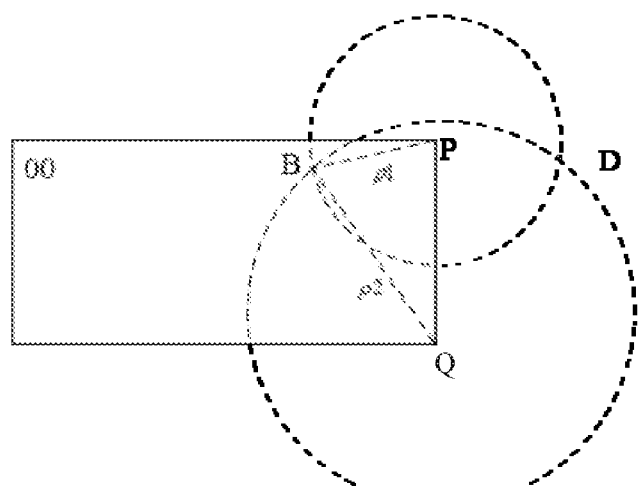
FIG. 2f is a schematic diagram showing the determination of a point of a light emitting surface of a display panel based on a positional identifier according to another embodiment of the present disclosure.

According to the positional identifiers $\rho_1$ and $\rho_2$, a unique point can be determined on the light emitting surface 00 on the display panel. The positional identifiers obtained by the display panel test device according to the above embodiments can be uniquely determined by the distances between the point on the light emitting surface 00 and the two vertices of the display panel. In other words, the point defined by the positional identifiers is an intersection of two circles with lengths of $\rho_1$ and $\rho_2$ as radiuses on the light emitting surface 00 of the display panel. Here, as shown in FIG. 2e, when the first vertex P and the second vertex Q are two vertices on a diagonal line on the light emitting surface 00 of the display panel, the circles with the lengths of $\rho_1$ and $\rho_2$ as radiuses have two intersections on the light emitting surface 00 of the display panel (i.e., points B and I) in FIG. 2e). Therefore, a unique point cannot be determined according to the positional identifiers. As shown in FIG. 2f, when the first vertex P and the second vertex Q are two adjacent vertices on the light emitting surface 00 of the display panel, the circles with the lengths of $\rho_1$ and $\rho_2$ as radiuses have only one intersection on the light emitting surface 00 of the display panel (i.e., points B in FIG. 2f). As shown in FIG. 2f, another intersection (i.e., point D in FIG. 2f) is not within the light emitting surface 00 of the display panel.

Optionally, the distance measurer is at least one of an infrared distance sensor, a laser distance sensor, an ultrasonic distance sensor, and a radar distance sensor. For example, in the case where the distance measurer is a laser distance sensor, a distance between the distance measurer and a vertex of the light emitting surface of the display panel can be measured by directing the laser emitted by the laser distance sensor toward the vertex.

In summary, the display panel test device according to the embodiment of the present disclosure can determine the positional identifier of the positional point to which the measuring probe is aligned on the light emitting surface of the display panel through the position determination component, align the measuring probe to the to-be-tested point according to the positional identifier of the positional point and the positional identifier of the predefined to-be-tested point, and then acquire the optical characteristics of the to-be-tested point through the Color Analyser. In this way, it is not necessary to visually place the measuring probe over the to-be-tested point, thereby improving the determination accuracy of the to-be-tested point. Therefore, the problem that there is a relatively large error by visually placing the measuring probe of the Color Analyser over the to-be-tested point in the related art can be resolved. In addition, an effect of accurately determining the position of the to-be-tested point on the display panel to analyse the optical characteristics thereof can be achieved.

Figure 3:
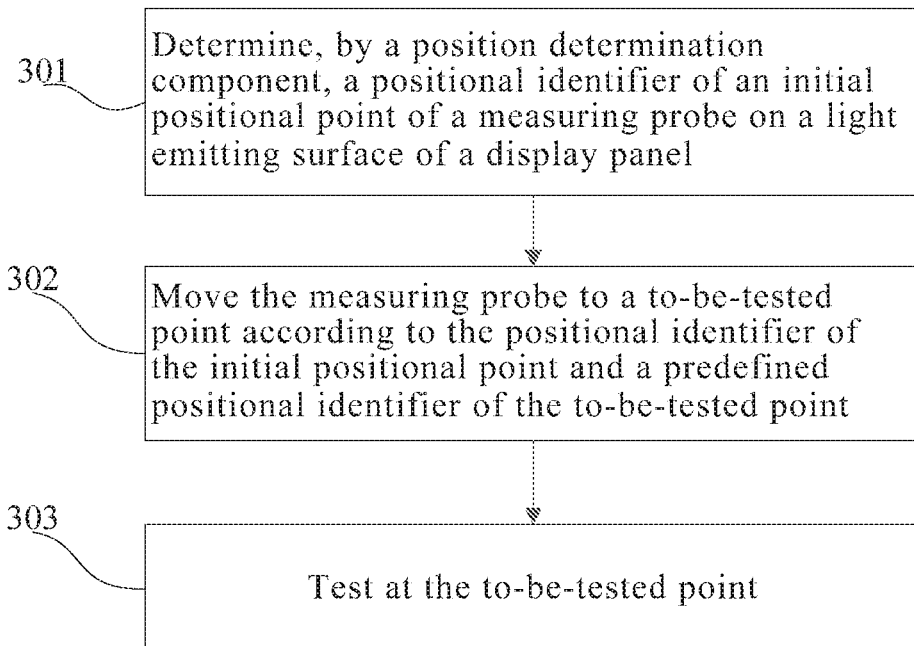
FIG. 3 is a flowchart showing a display panel test method according to an embodiment of the present disclosure.

FIG. 3 is a flowchart of a display panel test method according to an exemplary embodiment. The method can be applied to a display panel test device including a position determination component and a Color Analyser as shown in FIG. 1, 2a, 2h, 2c, 2d, or 2e, wherein the Color Analyser includes a host and a measuring probe. The method comprises steps of:

Step 301: determining, by a position determination component, a positional identifier of an initial positional point of a measuring probe on a light emitting surface of a display panel;

Step 302: moving the measuring probe to a to-be-tested point according to the positional identifier of the initial positional point and a predefined positional identifier of the to-be-tested point; and Step 303: testing at the to-be-tested point.

In summary, the display panel test method according to the embodiment of the present disclosure can determine the positional identifier of the positional point to which the measuring probe is aligned on the light emitting surface of the display panel through the position determination component, align the measuring probe to the to-be-tested point according to the positional identifier of the positional point and the positional identifier of the predefined to-be-tested point, and then acquire the optical characteristics of the to-be-tested point through the color analyser. In this way, it is not necessary to visually place the measuring probe over the to-be-tested point, thereby improving the determination accuracy of the to-be-tested point. Therefore, the problem that there is a relatively large error by visually placing the measuring probe of the color analyser over the to-be-tested point in the related art can be resolved. In addition, an effect of accurately determining the position of the to-be-tested point on the display panel to analyse the optical characteristics thereof can be achieved.

Figure 4:
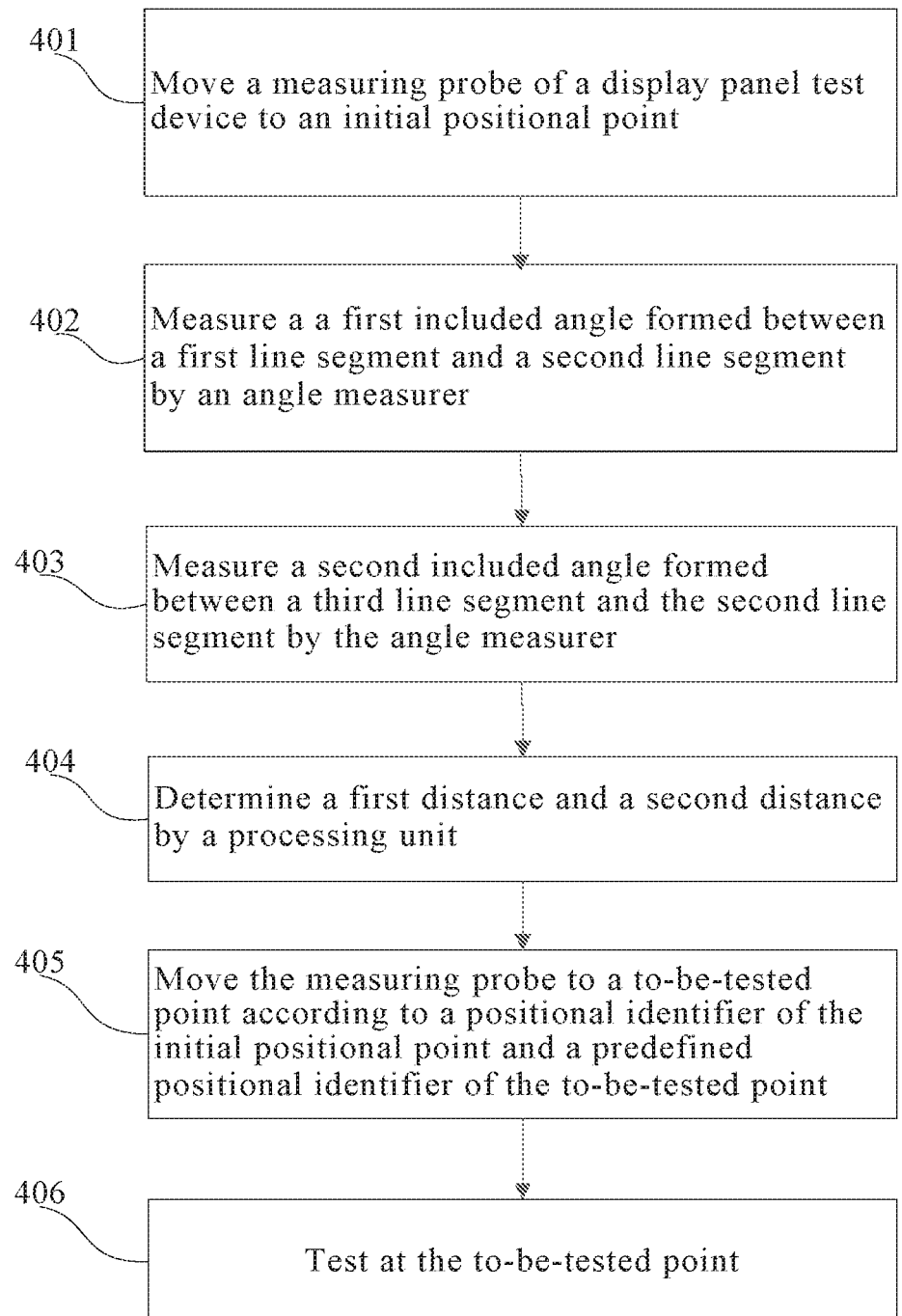
FIG. 4 is a flowchart of a display panel test method according to another embodiment of the present disclosure.

FIG. 4 is a flowchart of a display panel testing method according to another exemplary embodiment. The display panel test method can be applied to the display panel test device shown in FIG. 2b. The display panel test method may comprise steps of:

Step 401: moving a measuring probe in the display panel test device to an initial positional point;

Step 402: measuring a first included angle formed between a first line segment and a second line segment by an angle measurer;

Step 403: measuring a second included angle formed between a third line segment and the second line segment by the angle measurer;

Step 404: determining a first distance and a second distance by a processing unit.

Step 405: moving the measuring probe to a to-be-tested point according to a positional identifier of the initial positional point and a predefined positional identifier of the to-be-tested point; and Step 406: testing at the to-be-tested point.

As shown in FIG. 2b, after the measuring probe 10222 is moved to the initial positional point, the test surface d is attached to the light emitting surface 00 of the display panel.

The initial positional point may be any one point on the light emitting surface of the display panel or may be a point at which the measuring probe is aligned after an operator places the measuring probe on the light emitting surface of the display panel according to his/her experience. This initial positional point may not be a fixed point. The initial point may be different each time the optical characteristics is tested.

As shown in FIG. 2b, the first line segment is defined as a line segment m where the calibration point A and the first vertex P of the light-emitting surface 00 of the display panel are connected. The second line segment is defined as a line segment h where the calibration point A and the positional point B are connected. The first included angle a formed between the first segment m and the second line segment h can be measured by an angle measurer 1012.

As shown in FIG. 2h, the third segment n is defined as a line segment where the calibration point A and the second vertex Q of the light emitting surface 00 of the display panel are connected. The second included angle b formed between the third line segment n and the second line segment h can be measured by the angle measurer 1012.

Here, at Steps 402 and 403, the first vertex P and the second vertex Q are any two adjacent vertices on the light emitting surface 00 of the display panel.

In addition, Step 403 may be performed prior to Step 402, or Step 403 may be performed concurrently with Step 402.

As shown in FIG. 2b, the processing unit 1011 can determine the first distance $\rho_1$ between the positional point B and the first vertex P according to the first included angle a and the length of the second line segment h and can determine: the second distance $\rho_2$ between the positional point B and the second vertex Q according to the second included angle b and the length of the second line segment h. The first distance $\rho_1$ and the second distance $\rho_2$ can form the positional identifiers. According to the positional identifier, a unique point can be determined on the light emitting surface of the display panel, as shown in FIG. 2e.

Optionally, since the line segment connecting the calibration point A and the positional point B is perpendicular to the test surface d, when the test surface d is attached to the light emitting surface 00 of the display panel, the line segment connecting the calibration point A and the positional point B is perpendicular to the light emitting surface 00 of the display panel. In this regard, the calibration point A, the location point B, and the first vertex P constitute a right triangle, and the calibration point A, the location point B, and the second vertex Q also constitute a right triangle. The processing unit can calculate values of $\rho_1$ and $\rho_2$ according to a formula: $\rho_1=h_1 \tan a$ and a formula: $\rho_2=h_1 \tan b$, where $h_1$ is the length of the second line segment, and h1 is a known value which can be set by the tester.

After the positional identifier of the initial positional point is determined, the measuring probe may be moved according to the relative position of the positional identifier of the initial positional point and the positional identifier of the predefined to-be-tested point, and a positional identifier of a positional point to which the measuring probe is aligned on the light emitting surface of the display panel can be determined by the position determination component during the movement. When the positional identifier of the positional point to which the measuring probe is aligned is the positional identifier of the predefined to-be-tested point, the measuring probe stops moving.

The positional identifier of the predefined to-be-tested point can be determined before the test, and one or more to-be-tested points can be arranged in practical applications.

After the measuring probe is moved to the predefined to-be-tested point, image information of the to-be-tested point can be obtained through the measuring probe, and the optical characteristics of the to-be-tested point can be obtained by analysing the image information through the host.

The tester may perform Steps 401 to 406 to test the optical characteristics of the to-be-tested points on the light emitting surfaces of display panels having the same model, so as to ensure that the positions of the to-be-tested points are substantially the same on the light emitting surfaces of varied tested display panels.

In summary, the display panel test method according to the embodiment of the present disclosure can determine the positional identifier of the positional point to which the measuring probe is aligned on the light emitting surface of the display panel through the position determination component, align the measuring probe to the to-be-tested point according to the positional identifier of the positional point and the positional identifier of the predefined to-be-tested point, and then acquire the optical characteristics of the to-be-tested point through the color analyser. In this way, it is not necessary to visually place the measuring probe over the to-be-tested point, thereby improving the determination accuracy of the to-be-tested point. Therefore, the problem that there is a relatively large error by visually placing the measuring probe of the color analyser over the to-be-tested point in the related art can be resolved. In addition, an effect of accurately determining the position of the to-be-tested point on the display panel to analyse the optical characteristics thereof can be achieved.

Figure 5:
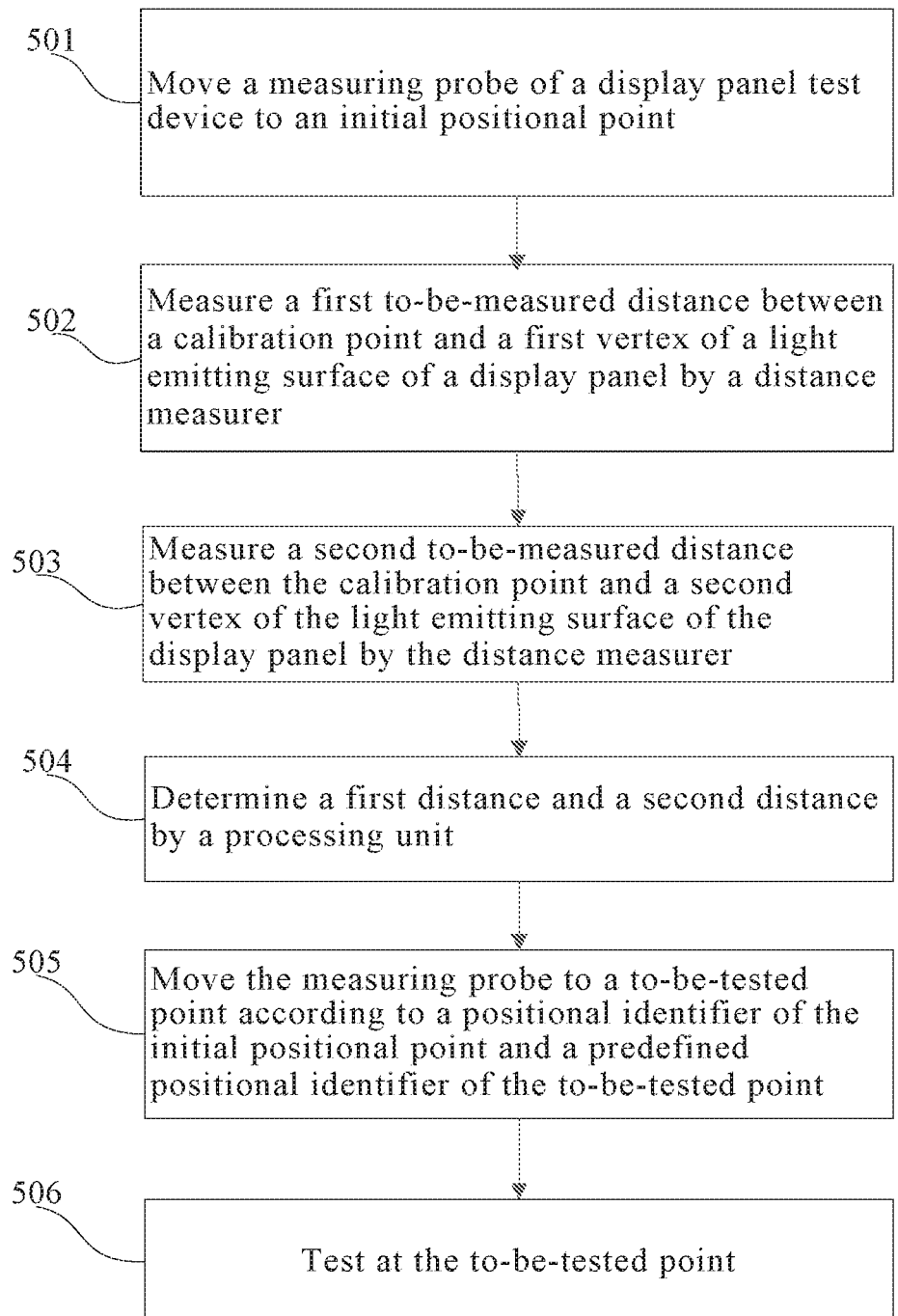
FIG. 5 is a flowchart of a display panel testing method according to another embodiment of the present disclosure.

FIG. 5 is a flowchart of a display panel test method according to another exemplary embodiment, which can be applied to the device as set forth above in FIG. 2c. The display panel test method may comprise steps of:

Step 501: moving a measuring probe of a display panel test device to an initial positional point;

Step 502: measuring a first to-be-measured distance between a calibration point and a first vertex of a light emitting surface of a display panel by a distance measurer;

Step 503: measuring a second to-be-measured distance between the calibration point and a second vertex of the light emitting surface of the display panel by the distance measurer, wherein the first vertex and the second vertex are any two adjacent vertices on the light emitting surface of the display panel;

Step 504, determining a first distance and a second distance by a processing unit;

Step 505, moving the measuring probe to a to-be-tested point according to a positional identifier of the initial positional point and a predefined positional identifier of the to-be-tested point; and Step 506: testing at the to-be-tested point.

As shown in FIG. 2c, the first to-be-measured distance is defined as a length of a line segment m where the calibration point A and the first vertex P are connected, and the second to-be-measured distance is defined as a length of a line segment n where the calibration point A and the second vertex Q are connected.

At Steps 502 and 503, the first vertex P and the second vertex Q are any two adjacent vertices on the light emitting surface of the display panel.

In addition, Step 503 may be performed prior to Step 502, or Step 503 may be performed concurrently with Step 502.

As shown in FIG. 2c, the processing unit 1011 can determine the first distance $\rho_1$ between the positional point B and the first vertex P according to the first to-be-measured distance and the length of the second line segment h and can determine the second distance between the positional point B and the second vertex Q according to the second to-be-measured distance and the length of the second line segment h. The first distance $\rho_1$ and the second distance $\rho_2$ can form the positional identifiers. According to the positional identifier, a unique point can be determined on the light emitting surface of the display panel.

Optionally, since the line segment connecting the calibration point A and the positional point B is perpendicular to the test surface d, when the test surface d is attached to the light emitting surface 00 of the display panel, the line segment connecting the calibration point A and the positional point B is perpendicular to the light emitting surface 00 of the display panel. In this regard, the calibration point A, the location point B, and the first vertex P constitute a right triangle, and the calibration point A, the location point B, and the second vertex Q also constitute a right triangle. According to a formula: $\rho_1=\sqrt{m_1^2-h_1^2}$ and a formula: $\rho_2=\sqrt{n_1^2-h_1^2}$, the processing unit can calculate values of $\rho_1$ and $\rho_2$ as the positional identifiers of the initial positional point, wherein $h_1$ is the length of the second line segment, $m_1$ is the first to-be-measured distance, and $n_1$ is the second to-be-measured distance.

After the measuring probe is moved to the predefined to-be-tested point, image information of the to-be-tested point can be obtained through the measuring probe, and the optical characteristics of the to-be-tested point can be obtained by analysing the image information through the host.

The tester may perform Steps 501 to 506 to test the optical characteristics of the to-be-tested points on the light emitting surfaces of display panels having the same model, so as to ensure that the positions of the to-be-tested points are substantially the same on the light emitting surfaces of varied tested display panels.

In summary, the display panel test method according to the embodiment of the present disclosure can determine the positional identifier of the positional point to which the measuring probe is aligned on the light emitting surface of the display panel through the position determination component, align the measuring probe to the to-be-tested point according to the positional identifier of the positional point and the positional identifier of the predefined to-be-tested point, and then acquire the optical characteristics of the to-be-tested point through the color analyser. In this way, it is not necessary to visually place the measuring probe over the to-be-tested point, thereby improving the determination accuracy of the to-be-tested point. Therefore, the problem that there is a relatively large error by visually placing the measuring probe of the color analyser over the to-be-tested point in the related art can be resolved. In addition, an effect of accurately determining the position of the to-be-tested point on the display panel to analyse the optical characteristics thereof can be achieved.

Figure 6:
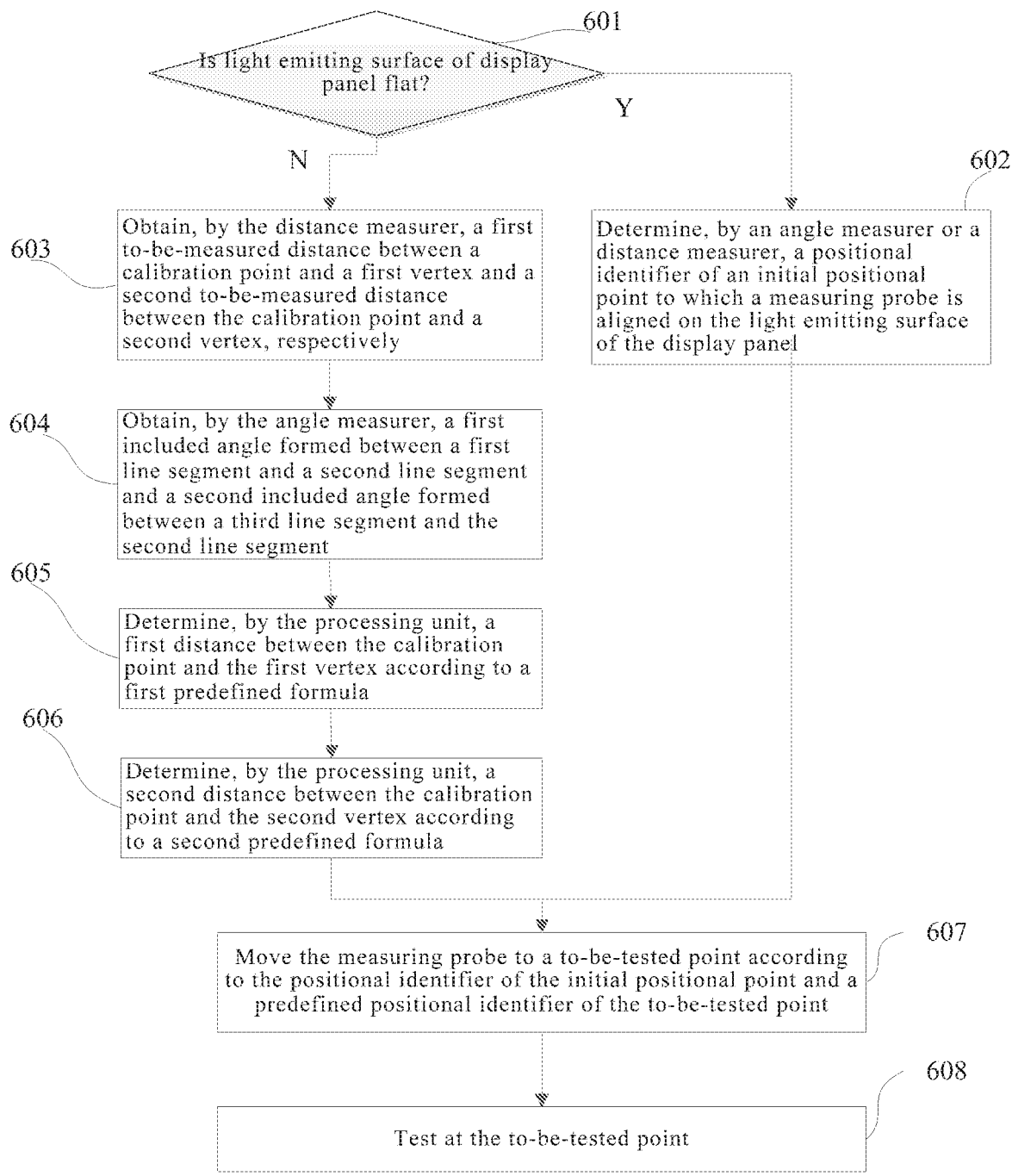
FIG. 6 is a flowchart of a display panel test method according to another embodiment of the present disclosure.

FIG. 6 is a flowchart of a display panel test method according to another exemplary embodiment, which can be applied to the device as set forth above in FIG. 2d. The display panel test method may comprise steps of:

Step 601: determining, by a processing unit, whether a light emitting surface of a display panel is flat, wherein in a condition that the light emitting surface of the display panel is flat, go to Step 602; or in a condition that the light emitting surface of the display panel is not flat, go to Step 603;

Step 602, determining, by an angle measurer or a distance measurer, a positional identifier of an initial positional point to which a measuring probe is aligned on the light emitting surface of the display panel and then performing Step 607;

Step 603, obtaining, by the distance measurer, a first to-be-measured distance between a calibration point and a first vertex and a second to-be-measured distance between the calibration point and a second vertex, respectively, and then performing Step 604;

Step 604, obtaining, by the angle measurer, a first included angle formed between a first line segment and a second line segment and a second included angle formed between a third line segment and the second line segment, and then performing Step 605;

Step 605, determining, by the processing unit, a first distance between the calibration point and the first vertex according to a first predefined formula, and then performing Step 606;

Step 606, determining, by the processing unit, a second distance between the calibration point and the second vertex according to a second predefined formula, and then performing Step 607;

Step 607: moving the measuring probe to a to-be-tested point according to the positional identifier of the initial positional point and a predefined positional identifier of the to-be-tested point, and then performing Step 608; and Step 608: testing at the to-be-tested point.

The processing unit can determine the flatness of the light emitting surface of the display panel according to the first included angle a, the first to-be-measured distance, and the length of the second line segment h, and/or the processing unit can determine the flatness of the light emitting surface of the display panel according to second included angle b, the second to-be-measured distance, and the length of the second line segment h, wherein the first to-be-measured distance is defined as a length of a line segment m where the calibration point A and the first vertex P are connected, and the second to-be-measured distance is defined as a length of a line segment n where the calibration point A and the second vertex Q are connected.

The processing unit may determine that the light emitting surface of the display panel is flat in a condition that cos a=$h_1/m_1$ and/or cos b=$h_1/n_1$, or determine that the light emitting surface of the display panel is not flat in other conditions. Here, $h_1$ is a length of the second line segment h, $m_1$ is the first to-be-measured distance, and $n_1$ is the second to-be-measured distance.

In addition, when a difference between cos a and $h_1/m_1$ is less than a predefined first threshold, cos a can be considered as being equal to $h_1/m_1$ and when a difference between cos b and $h_1/n_1$ is less than a predefined second threshold, cos b can be considered as being equal to $h_1/n_1$. The first threshold and the second threshold may be a specific value or a percentage (for example, a percentage of cos a, cos b, $h_1/m_1$, $h_1/n_1$ or the like). The first threshold and the second threshold may or may not be equal. The first threshold and the second threshold may be set according to a regular flatness of the display panel.

When the light emitting surface of the display panel is flat, the positional identifier of the initial positional point of the measuring probe on the light emitting surface of the display panel can be determined by the angle measurer (for example, reference can be made to Steps 401 to 404), or the positional identifier of the initial positional point of the measuring probe on the light emitting surface of the display panel can be determined by the distance measurer (for example, reference can be made to Steps 501 to 504).

When the display panel is not flat, as shown in FIG. 2c1, the distance measurer 1013 can obtain the first to-be-measured distance between the calibration point A and the first vertex P and the second to-be-measured distance between the calibration point A and the second vertex Q.

As shown in FIG. 2d the angle measurer 1012 can obtain the first included angle a formed between the first line segment m and the second line segment h, and the second included angle b formed between the third line segment n and the second line segment h.

In addition, Step 604 may be performed prior to Step 603, or Step 604 may be performed concurrently with Step 603.

Here, the first predefined formula is $\rho_1 = \sqrt{m_1^2 + h_1^2 - 2m_1 h_1 \cos a}$, wherein $\rho_1$ is the first distance, $m_1$ is the first to-be-measured distance, $h_1$ is the length of the second line segment h, and a is the first included angle. In other words, the first distance can be determined based on the cosine theorem.

Here, the second predefined formula is $\rho_2 = \sqrt{n_1^2 + h_1^2 - 2n_1 h_1 \cos b}$, wherein $\rho_2$ is the second distance, $n_1$ is the second to-be-measured distance, and b is the second included angle. In other words, the second distance can be determined based on the cosine theorem.

Through Steps 605 and 606, $\rho_1$ and $\rho_2$ can be determined. $\rho_1$ and $\rho_2$ can form the positional identifiers of the initial positional point. According to the positional identifier, a unique point can be determined on the light emitting surface of the display panel. Here, the length $h_1$ of the second line segment h is a known value which can be set by the tester.

In addition, Step 606 may be performed prior to Step 605, or Step 606 may be performed concurrently with Step 605.

It should be noted that, when the display panel is flat, Steps 603 to 606 may also be performed to determine the positional identifier of the initial positional point.

After the step of moving the measuring probe to the predefined to-be-tested point, image information of the to-be-tested point can be obtained by the measuring probe. The optical characteristics of the to-be-tested point can be obtained by analyzing the image information through the host.

The tester may perform the Steps 601 to 608 to test the optical characteristics of the to-be-tested points on the light emitting surfaces of display panels having the same model, so as to ensure that the positions of the to-be-tested points are substantially the same on the light emitting surfaces of varied tested display panels.

In summary, the display panel test method according to the embodiment of the present disclosure can determine the positional identifier of the positional point to which the measuring probe is aligned on the light emitting surface of the display panel through the position determination component, align the measuring probe to the to-be-tested point according to the positional identifier of the positional point and the positional identifier of the predefined to-be-tested point, and then acquire the optical characteristics of the to-be-tested point through the color analyser. In this way, it is not necessary to visually place the measuring probe over the to-be-tested point, thereby improving the determination accuracy of the to-be-tested point. Therefore, the problem that there is a relatively large error by visually placing the measuring probe of the color analyser over the to-be-tested point in the related art can be resolved. In addition, an effect of accurately determining the position of the to-be-tested point on the display panel to analyse the optical characteristics thereof can be achieved.

The term "and/or" in the embodiments of the present disclosure is merely an association relationship that describes associated objects and indicates three possible relationships. For example, "A and/or B" may indicate three situations, in which only A exists, both of A and B exist, and only B exists.

All of the foregoing optional technical solutions/schemes may be arbitrarily combined to form alternative embodiments of the present disclosure, and will not be described repeatedly herein.

It should be noted that the display panel test device according to the above embodiments only uses the division of the above functional components when the optical characteristics of the display panel. In practical applications, the above functions may be allocated by different functional components according to requirements. In other words, the internal structure of the device is divided into different functional components to complete all or some of the functions as described above. In addition, the embodiments of the display panel test device and the display panel test method according to the above embodiments belong to the same concept. For the specific implementation processes, reference can made to the method embodiments. Therefore, description thereof can be omitted herein.

The descriptions as set forth are merely preferred embodiments of the present disclosure and are not intended to limit the present disclosure. Any modifications, equivalents and improvements made within the spirit and principle of the present disclosure shall fall into the protection of the present disclosure.

What is claimed is:

1. A display panel test device, comprising:
a color analyser, including a host and a measuring probe, the measuring probe having a measuring rod and a probe body disposed at one end of the measuring rod is configured to obtain optical information of a positional point on a light emitting surface of a display panel, the positional point being a point to which the measuring probe is aligned on the light emitting surface of the display panel, and the host is configured to determine optical characteristics of the positional point according to the optical information; and
a position determination component, configured to determine a positional identifier of the positional point on the light emitting surface of the display panel, the positional identifier being capable of indicating a relative position of the positional point on the light emitting surface of the display panel, wherein the position determination component is disposed at a calibration point of the measuring rod such that a straight line defined by the calibration point and the positional point is perpendicular to the light emitting surface of the display panel.

2. The display panel test device according to claim 1, wherein
the position determination component further comprises a processing unit and an angle measurer, and the light emitting surface of the display panel is formed into a shape having at least three vertices;
the angle measurer is disposed at the calibration point of the measuring rod;
the angle measurer is configured to measure a first included angle formed between a first line segment and a second line segment, wherein the first line segment is defined as a line segment where the calibration point and a first vertex of the light emitting surface of the display panel are connected, and the second line segment is defined as a line segment where the calibration point and the positional point are connected;
the angle measurer is further configured to measure a second included angle formed between a third line segment and the second line segment, wherein the third line segment is defined as a line segment where the calibration point and a second vertex of the light emitting surface of the display panel are connected, and the first vertex and the second vertex are any two adjacent vertices of the light emitting surface of the display panel; and
the processing unit is configured to determine a first distance between the positional point and the first vertex according to the first included angle and a length of the second line segment and determine a second distance between the positional point and the second vertex according to the second included angle and the length of the second line segment, wherein the first distance and the second distance form the positional identifiers.

3. The display panel test device according to claim 2, wherein
the measuring rod and the position determination component are rotatably connected such that the position determination component is able to rotate about an axis of the measuring rod.

4. The display panel test device according to claim 1, wherein
the position determination component further comprises a processing unit and a distance measurer, and the light emitting surface of the display panel is formed into a shape having at least three vertices;
the distance measurer is disposed at the calibration point of the measuring rod;
the distance measurer is configured to measure a first to-be-measured distance between the calibration point and a first vertex on the light emitting surface of the display panel, and to measure a second to-be-measured distance between the calibration point and a second vertex on the light emitting surface of the display panel, wherein the first vertex and the second vertex are any two adjacent vertices of the light emitting surface of the display panel; and
the processing unit is configured to determine a first distance between the positional point and the first vertex according to a distance between the calibration point and the positional point and the first to-be-measured distance, and determine a second distance between the positional point and the second vertex according to a distance between the calibration point and the positional point and the second to-be-measured distance, wherein the first distance and the second distance form the positional identifiers.

5. The display panel test device according to claim 4, wherein
the distance measurer is at least one of an infrared distance sensor, a laser distance sensor, an ultrasonic distance sensor, and a radar distance sensor.

6. The display panel test device according to claim 4, wherein
the measuring rod and the position determination component are rotatably connected such that the position determination component is able to rotate about an axis of the measuring rod.

7. The display panel test device according to claim 1, wherein
the position determination component further comprises a processing unit, a distance measurer, and an angle measurer, the distance measurer and the angle measurer are disposed at the calibration point of the measuring rod, and the light emitting surface of the display panel is formed into a shape having at least three vertices;
the distance measurer is configured to measure a first to-be-measured distance between the calibration point and a first vertex, and to measure a second to-be-measured distance between the calibration point and a second vertex, wherein the first vertex and the second vertex are any two adjacent vertices of the light emitting surface of the display panel;
the angle measurer is configured to measure a first included angle formed between a first line segment and a second line segment, and the angle measurer is further configured to measure a second included angle formed between a third line segment and the second line segment, wherein the first line segment is defined as a line segment where the calibration point and the first vertex are connected, the second line segment is defined as a line segment where the calibration point and the positional point are connected, and the third line segment is defined as a line segment where the calibration point and the second vertex are connected; and
the processing unit is configured to determine a first distance between the calibration point and the first vertex according to a length of the second line segment, the first to-be-measured distance and the first included angle, and determine a second distance between the calibration point and the second vertex according to the length of the second line segment, the second to-be-measured distance and the second included angle, wherein the first distance and the second distance form the positional identifiers.

8. The display panel test device according to claim 7, wherein
the probe body has a test surface capable of being attached to the positional point to obtain optical information of the positional point, and the straight line defined by the calibration point and the positional point is perpendicular to the test surface;
the processing unit is further configured to determine a flatness of the light emitting surface of the display panel according to the first included angle, the first to-be-measured distance and the length of the second line segment, wherein the first to-be-measured distance is defined as a distance between the calibration point and the first vertex;
and/or the processing unit is configured to determine a flatness of the light emitting surface of the display panel according to the second included angle, the second to-be-measured distance and the length of the second line segment, wherein the second to-be-measured distance is defined as a distance between the calibration point and the second vertex.

9. The display panel test device according to claim 8, wherein
the distance measurer is at least one of an infrared distance sensor, a laser distance sensor, an ultrasonic distance sensor, and a radar distance sensor.

10. The display panel test device according to claim 8, wherein
the measuring rod and the position determination component are rotatably connected such that the position determination component is able to rotate about an axis of the measuring rod.

11. The display panel test device according to claim 7, wherein
the distance measurer is at least one of an infrared distance sensor, a laser distance sensor, an ultrasonic distance sensor, and a radar distance sensor.

12. The display panel test device according to claim 7, wherein
the measuring rod and the position determination component are rotatably connected such that the position determination component is able to rotate about an axis of the measuring rod.

13. A display panel test method, comprising steps of:
providing the display panel test device according to claim 1;
determining, by the position determination component, a positional identifier of an initial positional point of the measuring probe on a light emitting surface of a display panel;
moving the measuring probe to a to-be-tested point according to the positional identifier of the initial positional point and a predefined positional identifier of the to-be-tested point; and
testing at the to-be-tested point.

14. The method according to claim 13, wherein
the position determination component further comprises a processing unit and an angle measurer,
the angle measurer is disposed at the calibration point of the measuring rod, and the light emitting surface of the display panel is formed into a shape having at least three vertices, and
the step of determining, by the position determination component, a positional identifier of an initial positional point of the measuring probe on a light emitting surface of a display panel comprises:
measuring a first included angle formed between a first line segment and a second line segment by an angle measurer, wherein the first line segment is defined as a line segment where the calibration point and a first vertex of the light-emitting surface of the display panel are connected, and the second line segment is defined as a line segment where the calibration point and the positional point are connected;
measuring a second included angle formed between a third line segment and the second line segment by the angle measurer, wherein the third line segment is defined as a line segment where the calibration point and a second vertex of the light emitting surface of the display panel are connected, and the first vertex and the second vertex are any two adjacent vertices on the light emitting surface of the display panel; and determining, by the processing unit, a first distance between the positional point and the first vertex according to the first included angle and a length of the second line segment and determining a second distance between the positional point and the second vertex according to the second included angle and the length of the second line segment, wherein first distance and the second distance form the positional identifiers.

15. The method according to claim 13, wherein
the position determination component further comprises a processing unit and a distance measurer,
the distance measurer is disposed at the calibration point of the measuring rod the light emitting surface of the display panel is formed into a shape having at least three vertices, and
the step of determining, by the position determination component, a positional identifier of an initial positional point of the measuring probe on a light emitting surface of a display panel comprises:
measuring a first to-be-measured distance between the calibration point and a first vertex of the light emitting surface of the display panel by the distance measurer;
measuring a second to-be-measured distance between the calibration point and a second vertex of the light emitting surface of the display panel by the distance measurer, wherein the first vertex and the second vertex are any two adjacent vertices on the light emitting surface of the display panel; and
determining, by the processing unit, a first distance between the positional point and the first vertex according to a distance between the calibration point and the positional point and the first to-be-measured distance and determining a second distance between the positional point and the second vertex according to the distance between the calibration point and the positional point and the second to-be-measured distance, wherein the first distance and the second distance form the positional identifiers.

16. The method according to claim 13, wherein
the position determination component further comprises a processing unit, a distance measurer, and an angle measurer, the distance measurer and the angle measurer are disposed at the calibration point of the measuring rod, and the light emitting surface of the display panel is formed into a shape having at least three vertices,
the step of determining, by the position determination component, a positional identifier of an initial positional point of the measuring probe on a light emitting surface of a display panel comprises:
measuring, by the distance measurer, a first to-be-measured distance between the calibration point and a first vertex, and a second to-be-measured distance between the calibration point and a second vertex, wherein the first vertex and the second vertex are any two adjacent vertices on the light emitting surface of the display panel;
measuring, by the angle measurer, a first included angle formed between a first line segment and a second line segment, and a second included angle formed between a third line segment and the second line segment, wherein the first line segment is defined as a line segment where the calibration point and the first vertex are connected, the second line segment is defined as a line segment where the calibration point and the positional point are connected and the third line segment is defined as a line segment where the calibration point and the second vertex are connected; and determining, by the processing unit, a first distance between the calibration point and the first vertex according to a length of the second line segment, the first to-be-measured distance and the first included angle, and determining a second distance between the calibration point and the second vertex according to the length of the second line segment, the second to-be-measured distance and the second included angle, wherein the first distance and the second distance form the positional identifiers.

17. The method according to claim 16, wherein
the step of determining, by the processing unit, a first distance between the calibration point and the first vertex according to a length of the second line segment, the first to-be-measured distance and the first included angle, and determining a second distance between the calibration point and the second vertex according to the length of the second line segment, the second to-be-measured distance and the second included angle, comprises:
determining, by the processing unit, the first distance between the calibration point and the first vertex according to a first predefined formula, which is $\rho_1 = \sqrt{m_1^2 + h_1^2 - 2m_1 h_1 \cos a}$, wherein $\rho_1$ is the first distance, m1 is the first to-be-measured distance, h1 is the length of the second line segment, and a is the first included angle; and
determining, by the processing unit, the second distance between the calibration point and the second vertex according to a second predefined formula, which is $\rho_2 = \sqrt{n_1^2 + h_1^2 - 2n_1 h_1 \cos b}$, wherein $\rho_2$ is the second distance, n1 is the second to-be-measured distance, and b is the second included angle.

18. The method according to claim 17, wherein
the probe body has a test surface capable of being attached to the positional point to obtain optical information of the positional point, and the straight line defined by the calibration point and the positional point is perpendicular to the test surface,
prior to the step of determining, by the processing unit, a first distance between the calibration point and the first vertex according to a length of the second line segment, the first to-be-measured distance and the first included angle, and determining a second distance between the calibration point and the second vertex according to the length of the second line segment, the second to-be-measured distance and the second included angle, the method further comprises:
determining, by the processing unit, a flatness of the light emitting surface of the display panel according to the first included angle, the first to-be-measured distance and the length of the second line segment, wherein the first to-be-measured distance is defined as a distance between the calibration point and the first vertex; and/or determining, by the processing unit, a flatness of the light emitting surface of the display panel according to the second included angle, the second to-be-measured distance and the length of the second line segment, wherein the second to-be-measured distance is defined as a distance between the calibration point and the second vertex; and performing the step of determining, by the processing unit, a first distance between the calibration point and the first vertex according to a length of the second line segment, the first to-be-measured distance and the first included angle, and determining a second distance between the calibration point and the second vertex according to the length of the second line segment, the second to-be-measured distance and the second included angle, in a condition that the light emitting surface of the display panel is not flat.

19. The method according to claim 16, wherein the probe body has a test surface capable of being attached to the positional point to obtain optical information of the positional point, and the straight line defined by the calibration point and the positional point is perpendicular to the test surface, prior to the step of determining, by the processing unit, a first distance between the calibration point and the first vertex according to a length of the second line segment, the first to-be-measured distance and the first included angle, and determining a second distance between the calibration point and the second vertex according to the length of the second line segment, the second to-be-measured distance and the second included angle, the method further comprises:

determining, by the processing unit, a flatness of the light emitting surface of the display panel according to the first included angle, the first to-be-measured distance and the length of the second line segment, wherein the first to-be-measured distance is defined as a distance between the calibration point and the first vertex; and/or determining, by the processing unit, a flatness of the light emitting surface of the display panel according to the second included angle, the second to-be-measured distance and the length of the second line segment, wherein the second to-be-measured distance is defined as a distance between the calibration point and the second vertex; and performing the step of determining, by the processing unit, a first distance between the calibration point and the first vertex according to a length of the second line segment, the first to-be-measured distance and the first included angle, and determining a second distance between the calibration point and the second vertex according to the length of the second line segment, the second to-be-measured distance and the second included angle, in a condition that the light emitting surface of the display panel is not flat.

\* \* \* \* \*